(12) United States Patent
Yang et al.

(10) Patent No.: US 11,337,038 B2
(45) Date of Patent: May 17, 2022

(54) METHOD, DEVICE AND SYSTEM FOR TRANSMITTING MULTICAST GROUP INFORMATION

(71) Applicant: ZTE CORPORATION, Guangdong (CN)

(72) Inventors: Kun Yang, Guangdong (CN); Hao Wu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 85 days.

(21) Appl. No.: 16/770,055

(22) PCT Filed: Dec. 5, 2018

(86) PCT No.: PCT/CN2018/119416
§ 371 (c)(1),
(2) Date: Jun. 4, 2020

(87) PCT Pub. No.: WO2019/109960
PCT Pub. Date: Jun. 13, 2019

(65) Prior Publication Data
US 2020/0296552 A1  Sep. 17, 2020

(30) Foreign Application Priority Data
Dec. 5, 2017  (CN) .......................... 201711271242.4

(51) Int. Cl.
*H04W 4/00* (2018.01)
*H04W 4/08* (2009.01)
(Continued)

(52) U.S. Cl.
CPC ............... *H04W 4/08* (2013.01); *H04W 4/80* (2018.02); *H04W 72/005* (2013.01)

(58) Field of Classification Search
CPC ....... H04W 4/08; H04W 4/80; H04W 72/005; H04W 72/00
(Continued)

(56) References Cited

U.S. PATENT DOCUMENTS 10,136,284 B2 * 11/2018 Palanisamy ......... H04L 67/1044
10,148,739 B2 * 12/2018 Yu ........................... H04W 4/38
(Continued)

FOREIGN PATENT DOCUMENTS

CN  106572447 A  4/2017
CN  107181777 A  9/2017
(Continued)

OTHER PUBLICATIONS

WIPO, International Search Report dated Jan. 28, 2019.
European Patent Office, Extended European Search Report dated Apr. 14, 2021 regarding EP18885053.1.

*Primary Examiner* — Marceau Milord
(74) *Attorney, Agent, or Firm* — Li & Cai Intellectual Property (USA) Office (57) ABSTRACT

The present disclosure relates to a method, a device and a system for transmitting multicast group information. The method includes: receiving, by a first CSE, multicast group information transmitted by an underlying network element, wherein the first CSE includes a CSE where a group is located; and setting, by the first CSE, attributes of multicast group resource according to the multicast group information.

14 Claims, 5 Drawing Sheets

(51) Int. Cl.
*H04W 4/80* (2018.01)
*H04W 72/00* (2009.01)

(58) Field of Classification Search
USPC .................................. 370/329, 312, 390, 408
See application file for complete search history.

(56) References Cited

U.S. PATENT DOCUMENTS

| | | | | |
|---|---|---|---|---|
| 10,382,926 | B2* | 8/2019 | Palanisamy | H04L 67/1044 |
| 10,517,138 | B2* | 12/2019 | Starsinic | H04L 29/06027 |
| 10,631,149 | B2* | 4/2020 | Palanisamy | H04W 4/08 |
| 11,051,359 | B2* | 6/2021 | Starsinic | H04L 67/1046 |
| 2013/0012231 | A1* | 1/2013 | Hall | H04W 4/021 |
| | | | | 455/456.2 |
| 2013/0219064 | A1* | 8/2013 | Zhang | H04W 4/18 |
| | | | | 709/225 |
| 2014/0369251 | A1* | 12/2014 | Zhang | H04L 12/1877 |
| | | | | 370/312 |
| 2015/0033312 | A1* | 1/2015 | Seed | H04L 63/08 |
| | | | | 726/7 |
| 2016/0007137 | A1* | 1/2016 | Ahn | H04L 41/0681 |
| | | | | 370/254 |
| 2016/0007138 | A1* | 1/2016 | Palanisamy | H04W 4/50 |
| | | | | 455/41.2 |
| 2016/0212732 | A1* | 7/2016 | Choi | H04W 4/70 |
| 2016/0241635 | A1* | 8/2016 | Yu | G06F 16/951 |
| 2018/0092133 | A1* | 3/2018 | Starsinic | H04W 76/40 |
| 2019/0045343 | A1* | 2/2019 | Palanisamy | H04L 67/1044 |
| 2019/0342734 | A1* | 11/2019 | Palanisamy | H04W 4/70 |
| 2020/0128613 | A1* | 4/2020 | Starsinic | H04W 4/06 |

FOREIGN PATENT DOCUMENTS

| | | |
|---|---|---|
| CN | 108206992 A | 6/2018 |
| EP | 3054625 A1 | 8/2016 |
| WO | WO 2016161242 A1 | 10/2016 |

* cited by examiner

METHOD, DEVICE AND SYSTEM FOR TRANSMITTING MULTICAST GROUP INFORMATION

CROSS-REFERENCE TO RELATED APPLICATIONS

This is a National Phase Application filed under 35 U.S.C. 371 as a national stage of PCT/CN2018/119416, filed on Dec. 5, 2018, an application claiming the priority of Chinese Patent Application No. 201711271242.4, filed on Dec. 5, 2017, the contents of which are incorporated herein in their entirety by reference.

TECHNICAL FIELD

The present disclosure relates to communication technology, and in particular, to a method, a device, and a system for transmitting multicast group information.

BACKGROUND

In application scenarios of the Internet of Things (IoT), the number of terminal devices is much greater than that of traditional mobile phone terminals, for example, terminals with the same or similar characteristics provided by the same IoT service provider are deployed in one or several fixed areas, for example, forest fire monitoring devices of a Forest Management Center are deployed in a forest, or, remote meter reading devices of the State Grid are deployed in a neighborhood.

In the above scenarios, between terminals and an underlying network, every time a terminal sends a request message, a response message to the request is generated on the underlying network at the same time in a case of remotely upgrading software of devices, that is, a large amount of signaling is generated in the interaction between the underlying network and the devices. In the related art, considering that the existing underlying networks, such as a 3GPP network, can provide multimedia broadcast multicast service (MBMS) to transmit data to the connected devices by broadcast with no need of feedback from the devices, it is possible for an application to establish a mechanism for using the services provided by the 3GPP network to send a request message to a group of same or similar devices, in order to reduce signaling overhead and save network resources.

However, groups of IoT services cannot use the multicast services provided by the 3GPP network in the related art.

SUMMARY

In view of the above technical problem, the present disclosure provides a method, a device, and a system for transmitting multicast group information, so as to solve the problem that the groups of IoT services cannot use the multicast services provided by the 3GPP network.

In order to achieve the objective of the present disclosure, the present disclosure provides a method for transmitting multicast group information, including: receiving, by a first Common Services Entity (CSE), multicast group information transmitted by an underlying network element, the first CSE including a CSE where a group is located; and setting, by the first CSE, attributes of multicast group resource according to the multicast group information.

In an embodiment, the multicast group information at least includes a multicast address and an address type, which are allocated by the underlying network element.

In an embodiment, the step in which the first CSE sets the attributes of multicast group resource according to the multicast group information includes: setting, by the first CSE, a value of the multicast address as a value of the attribute multicastAddress of multicast group resource; setting, by the first CSE, a value of the address type as a value of the attribute addressType of multicast group resource; and setting, by the first CSE, a mapping relationship between the multicast address and a fanout request target as a value of the attribute multicastGroupFanoutTarget of multicast group resource.

In an embodiment, the step in which the first CSE receives the multicast group information transmitted by the underlying network element includes: receiving, by the first CSE, a response message of multicast service request, which is fed back by the underlying network element through a Network Service Entity (NSE), and carries the multicast group information.

In an embodiment, the response message of multicast service request includes an allocate temporary mobile group identity (TMGI) response message.

In an embodiment, after the first CSE sets the attributes of multicast group resource according to the multicast group information, the method further includes: sending, by the first CSE, a create local multicast group resource request to a second CSE, wherein the create local multicast group resource request at least includes the multicast address, the address type, and the mapping relationship between the multicast address and the fanout request target, and the second CSE includes a CSE where members are located.

In an embodiment, after the first CSE sends the create local multicast group resource request to the second CSE, the method further includes: receiving, by the first CSE, a create local multicast group resource response message sent by the second CSE; and creating, by the first CSE, multicast group information locally according to the create local multicast group resource response message, wherein the multicast group information includes a multicast type, a multicast address, and an address type.

The present disclosure further provides a method for transmitting multicast group information, including: receiving, by an NSE, multicast group information transmitted by an underlying network element; and transmitting, by the NSE, the multicast group information to a first CSE which includes a CSE where a group is located.

In an embodiment, the step in which the NSE receives the multicast group information transmitted by the underlying network element includes: receiving, by the NSE, a response message of multicast service request, which is fed back by the underlying network element, and carries the multicast group information; and the step in which the NSE transmits the multicast group information to the first CSE includes: feeding, by the NSE, a response message of multicast service request back to the first CSE.

In an embodiment, the response message of multicast service request at least includes a multicast address and an address type.

In an embodiment, the response message of multicast service request includes an allocate TMGI response message.

The present disclosure further provides a device for transmitting multicast group information, the device being disposed at a first CSE and including: a receiving module configured to receive multicast group information transmitted by an underlying network element, wherein the first CSE includes a CSE where a group is located; and a processing module configured to set attributes of multicast group resource according to the multicast group information.

In an embodiment, the multicast group information at least includes a multicast address and an address type, which are allocated by the underlying network element.

In an embodiment, the processing module is further configured to set a value of the multicast address as a value of the attribute multicastAddress of multicast group resource, set a value of the address type as a value of the attribute addressType of multicast group resource, and set a mapping relationship between the multicast address and a fanout request target as a value of the attribute multicastGroupFanoutTarget of multicast group resource.

In an embodiment, the receiving module is further configured to receive a response message of multicast service request, which is fed back by the underlying network element through an NSE, and carries the multicast group information.

In an embodiment, the response message of multicast service request includes an allocate TMGI response message.

In an embodiment, the processing module is further configured to send a create local multicast group resource request to a second CSE, wherein the create local multicast group resource request at least includes the multicast address, the address type, and the mapping relationship between the multicast address and the fanout request target, and the second CSE includes a CSE where members are located.

In an embodiment, the receiving module is further configured to receive a create local multicast group resource response message sent by the second CSE; and the processing module is further configured to create multicast group information locally according to the create local multicast group resource response message, wherein the multicast group information includes a multicast type, a multicast address, and an address type.

The present disclosure further provides a device for transmitting multicast group information, the device being disposed at an NSE and including: a receiving module configured to receive multicast group information transmitted by an underlying network element; and a transmitting module configured to transmit the multicast group information to a first CSE which includes a CSE where a group is located.

In an embodiment, the receiving module is further configured to receive a response message of multicast service request, which is fed back by the underlying network element, and carries the multicast group information; and the transmitting module is further configured to feed a response message of multicast service request back to the first CSE.

In an embodiment, the response message of multicast service request at least includes a multicast address and an address type.

In an embodiment, the response message of multicast service request includes an allocate TMGI response message.

The present disclosure further provides a system for transmitting multicast group information, including: the device for transmitting multicast group information as described according to any one of the above devices being disposed at the first CSE, and the device for transmitting multicast group information as described according to any one of the above devices being disposed at the NSE.

With the method, device and system for transmitting multicast group information of the present disclosure, the multicast group information transmitted by the underlying network element is received by the first CSE which includes the CSE where the group is located, and the first CSE sets the attributes of multicast group resource according to the multicast group information, so that the first CSE can set the attributes of multicast group resource locally, which enables the CSE where the group is located in a multigroup on the IoT to communicate with a 3GPP network by use of multicast services.

The other technical features and advantages of the present disclosure will be illustrated below in the Description, and may become partially obvious through the Description, or be understood by enabling the present disclosure. The objectives and the other advantages of the present disclosure may be realized and attained with the structures particularly pointed out in the Description, Claims and Drawings.

BRIEF DESCRIPTION OF THE DRAWINGS

The accompanying drawings are intended to provide further understanding of the technical solutions of the present disclosure, and are incorporated in and constitute a part of the specification. The drawings, together with the embodiments of the present disclosure, are intended to illustrate the technical solutions of the present disclosure, but the technical solutions of the present disclosure are not limited thereto. In the drawings.

DETAILED DESCRIPTION

In order to make the objectives, technical solutions and advantages of the present disclosure clearer, the embodiments of the present disclosure are described in detail below with reference to the accompanying drawings. It should be noted that the embodiments and the technical features thereof in the present application may be arbitrarily combined with one another if no conflict is incurred.

The steps illustrated in the flowcharts of the drawings may be performed in a computer system such as a set of computer-executable instructions. In addition, although a logical order is illustrated in the flowchart, the steps illustrated or described may be performed in an order different from that described herein in some cases.

Specifically, the method for transmitting multicast group information provided by the embodiments of the present disclosure can be applied during a process of establishing a multicast group. The method for transmitting multicast group information provided by the embodiments may be performed by a device for transmitting multicast group information, and the device for transmitting multicast group information may be integrated into a physical machine, or be separately provided, and may be implemented as software and/or hardware. The method and the device for transmitting multicast group information provided by the embodiments are described in detail below.

Figure 1:
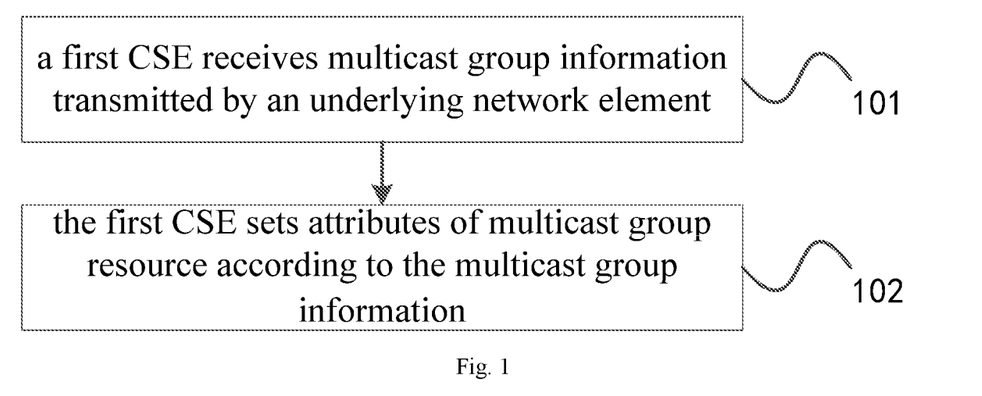
FIG. 1 is a flowchart illustrating an embodiment of a first method for transmitting multicast group information of the present disclosure.
Figure 2:
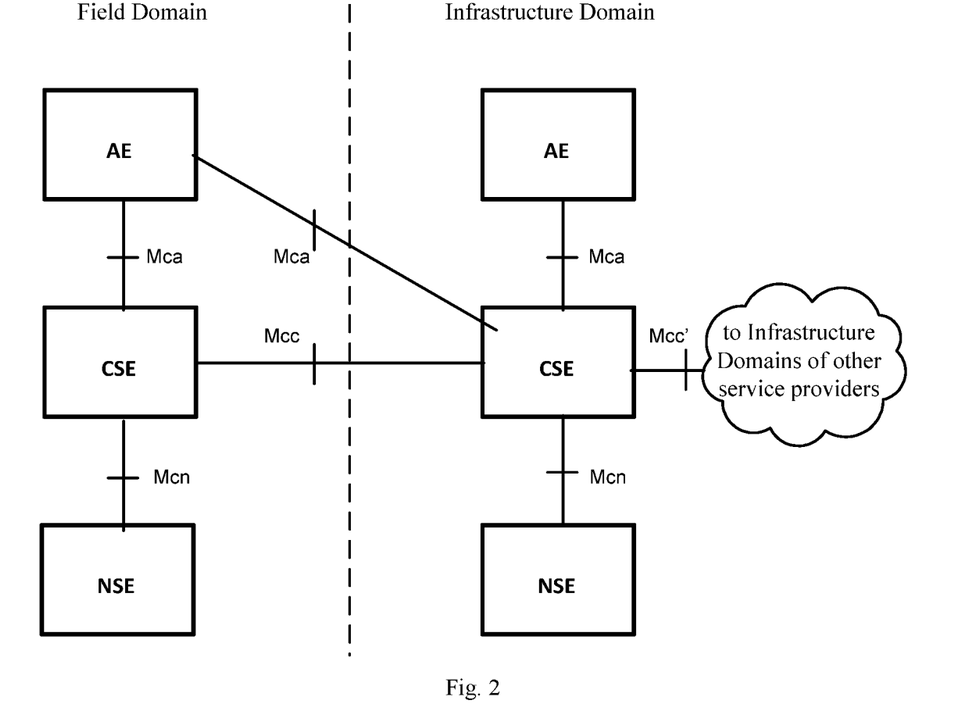
FIG. 2 is a schematic diagram of a functional architecture of oneM2M (an international standard organization for IoT) employed in the embodiment of the first method for transmitting multicast group information of the present disclosure.

FIG. 1 is a flowchart illustrating an embodiment of a first method for transmitting multicast group information of the present disclosure. FIG. 2 is a schematic diagram of a functional architecture of oneM2M (an international standard organization for IoT) employed in the embodiment of the first method for transmitting multicast group information of the present disclosure. As shown in FIG. 1, an execution subject in the embodiment may be a CSE, i.e., a CSE where a group is located, and the method for transmitting multicast group information provided by the present disclosure includes steps 101 to 102.

At step 101, a first CSE receives multicast group information transmitted by an underlying network element.

In the embodiment, the underlying network element may be a broadcast multicast-service center (BM-SC) or a multimedia broadcast multicast service gateway (MBMS GW).

Exemplarily, the first CSE represents an instantiation of a set of "common service functions" in an M2M environment. Such service functions are shown in FIG. 2, Mca reference points of M2M communication with AE and Mcc reference points of M2M communication with CSE are exposed to other entities. Mcn reference points of M2M communication with NSE are used to access an underlying network service entity, such as a Network Service Entity (NSE). Each CSE is identified with a unique CSE-ID. The service functions provided by the CSEs at least include: data management, device management, M2M service subscription management, and location services. Such service functions provided by the CSEs may be conceptualized as Common Service Function (CSF) in terms of logic and information function. In communication with 3GPP, a CSE may act as a Service Capability Server (SCS) to interact with a Service Capability Exposure Function (SCEF) via an Application Program Interface (API).

As shown in FIG. 2, Application Entity (AE) is an entity in an application layer that implements an M2M application service logic. Each application service logic can be resident in a plurality of M2M nodes and/or more than once in a single M2M node. Each execution instance of an application service logic is termed an "Application Entity" (AE) and is identified with a unique AE-ID. Examples of the AE include an instance of a fleet tracking application, a remote blood sugar monitoring application, a power metering application, and a controlling application. In communication with 3GPP, an AE can act as an Application Server (AS) to interact with an SCS.

At step 102, the first CSE sets attributes of multicast group resource according to the multicast group information.

Exemplarily, the step in which the first CSE sets the attributes of multicast group resource according to the multicast group information is implemented in at least the following ways: the first CSE sets a value of a multicast address as a value of the attribute multicastAddress of multicast group resource; the first CSE sets a value of an address type as a value of the attribute addressType of multicast group resource; and the first CSE sets a mapping relationship between the multicast address and a fanout request target as a value of the attribute multicastGroup-FanoutTarget of multicast group resource.

In the embodiment, the multicast group information transmitted by the underlying network element is received by the first CSE which includes a CSE where a group is located, and the first CSE sets the attributes of multicast group resource according to the multicast group information. In this way, the first CSE can set the attributes of multicast group resource locally, which enables a group of IoT services to use the multicast services provided by a 3GPP network.

Optionally, the multicast group information at least includes a multicast address and an address type, which are allocated by the underlying network element.

In an embodiment, based on the above embodiment, the step in which the first CSE sets the attributes of multicast group resource according to the multicast group information includes: the first CSE sets a value of the multicast address as a value of the attribute multicastAddress of multicast group resource; the first CSE sets a value of the address type as a value of the attribute addressType of multicast group resource; and the first CSE sets a mapping relationship between the multicast address and a fanout request target as a value of the attribute multicastGroupFanoutTarget of multicast group resource.

In an embodiment, based on the above embodiments, the step in which the first CSE receives the multicast group information transmitted by the underlying network element includes: the first CSE receives a response message of multicast service request, which is fed back by the underlying network element through an NSE, and carries the multicast group information.

Optionally, the response message includes an allocate temporary mobile group identity (TMGI) response message.

In an embodiment, based on the above embodiments, after the first CSE sets the attributes of multicast group resource according to the multicast group information, the method further includes: the first CSE sends a create local multicast group resource request to a second CSE, wherein the create local multicast group resource request at least includes the multicast address, the address type, and the mapping relationship between the multicast address and the fanout request target, and the second CSE includes a CSE where members are located.

In an embodiment, based on the above embodiments, after the first CSE sends the create local multicast group resource request to the second CSE, the method further includes: the first CSE receives a create local multicast group resource response message sent by the second CSE; and the first CSE creates multicast group information locally according to the create local multicast group resource response message, wherein the multicast group information includes a multicast address, a multicast type, and an address type.

Figure 3:
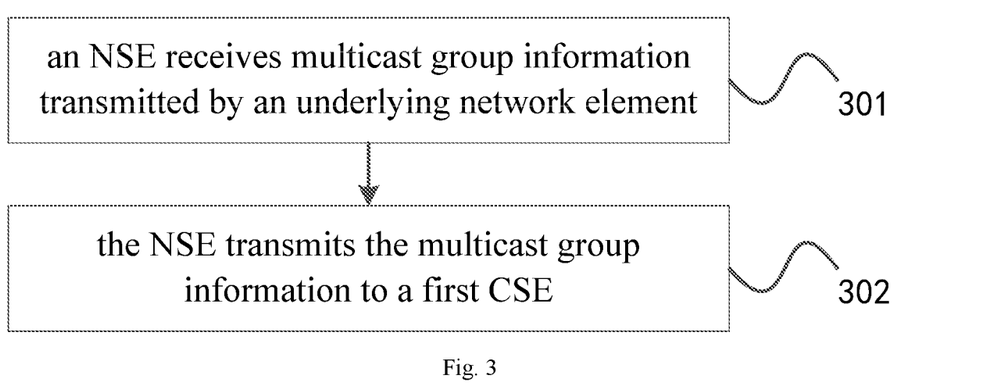
FIG. 3 is a flowchart illustrating an embodiment of a second method for transmitting multicast group information of the present disclosure.

FIG. 3 is a flowchart illustrating an embodiment of a second method for transmitting multicast group information of the present disclosure; and as shown in FIG. 3, an execution subject of the embodiment may be an NSE. The method for transmitting multicast group information provided by the present disclosure includes steps 301 to 302

At step 301, an NSE receives multicast group information transmitted by an underlying network element.

In the embodiment, the underlying network element may be a BM-SC or an MBMS GW. It should be noted that the multicast group information may be the multicast group information allocated by the MBMS GW.

Exemplarily, an NSE may provide an CSE with the services from an underlying network. The services may include device management, location services, and device triggering. In communication with 3GPP, an NSE can act as an SCEF, and a CSE may be connected to a 3GPP network through the SCEF, so as to use the services provided by the 3GPP network.

At step 302, the NSE transmits the multicast group information to a first CSE.

In the embodiment, the first CSE includes a CSE where a group is located.

In the embodiment, the NSE receives the multicast group information transmitted by the underlying network element, and the NSE transmits the multicast group information to the first CSE which includes the CSE where the group is located. In this way, the first CSE can set attributes of multicast group resource locally, which enables a group of IoT services to use the multicast services provided by a 3GPP network.

In an embodiment, based on the above embodiment, the step in which the NSE receives the multicast group information transmitted by the underlying network element includes: the NSE receives a response message of multicast service request, which is fed back by the underlying network element, and carries the multicast group information.

In an embodiment, based on the above embodiments, the step in which the NSE transmits the multicast group information to the first CSE includes: the NSE feeds a response message of multicast service request back to the first CSE.

In an embodiment, based on the above embodiments, the response message of multicast service request at least includes a multicast address and an address type.

In an embodiment, based on the above embodiments, the response message of multicast service request includes an allocate TMGI response message.

Figure 4:
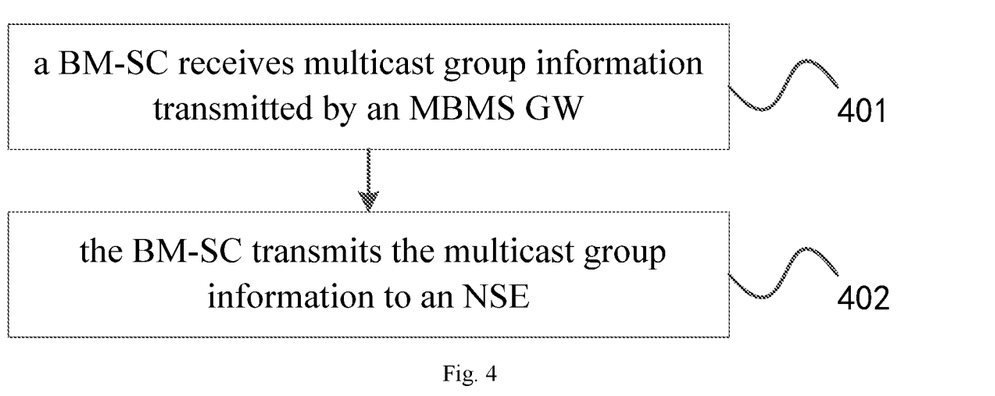
FIG. 4 is a flowchart illustrating an embodiment of a third method for transmitting multicast group information of the present disclosure.

FIG. 4 is a flowchart illustrating an embodiment of a third method for transmitting multicast group information of the present disclosure; and as shown in FIG. 4, an execution subject of the embodiment may be a BM-SC. The method for transmitting multicast group information provided by the present disclosure includes steps 401 to 402.

At step 401, a BM-SC receives multicast group information transmitted by an MBMS GW.

Optionally, the multicast group information may be carried in an allocate TMGI response message.

In the embodiment, the allocate TMGI response message at least includes a multicast address and an address type, which are allocated by the MBMS GW.

At step 402, the BM-SC transmits the multicast group information to an NSE.

Exemplarily, the multicast group information transmitted by the BM-SC to the NSE may be carried in an allocate TMGI response message.

In the embodiment, the first CSE can set attributes of multicast group resource locally, which enables a group of IoT services to use the multicast services provided by a 3GPP network.

Figure 5:
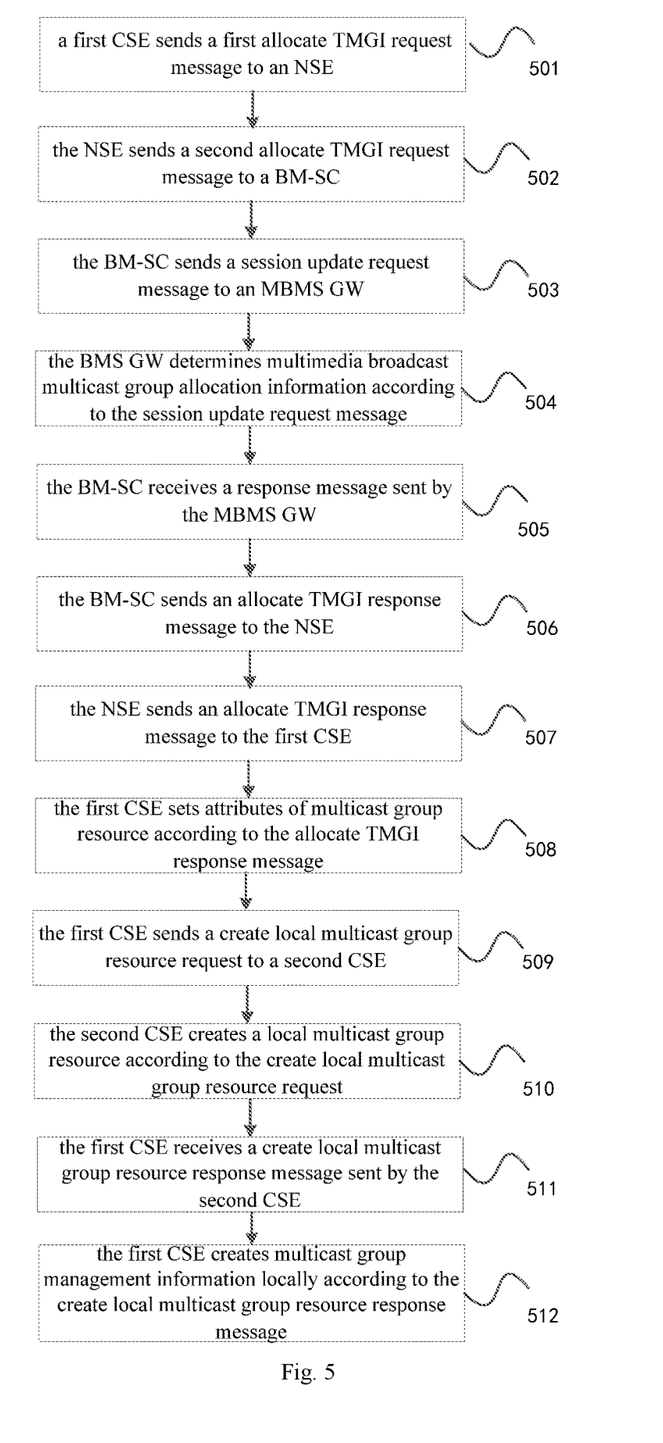
FIG. 5 is a flowchart illustrating an embodiment of a fourth method for transmitting multicast group information of the present disclosure.

FIG. 5 is a flowchart illustrating an embodiment of a fourth method for transmitting multicast group information of the present disclosure; and as shown in FIG. 5, a method for transmitting multicast group information provided by the present disclosure includes steps 501 to 512.

At step 501, a first CSE sends a first allocate TMGI request message to an NSE.

In the embodiment, the first allocate TMGI request message at least includes a multimedia broadcast multicast group identity (external group ID).

At step 502, the NSE sends a second allocate TMGI request message to a BM-SC.

In the embodiment, the second allocate TMGI request message at least includes a total number of TMGIs.

At step 503, the BM-SC sends a session update request message to an MBMS GW.

In the embodiment, the session update request message at least includes a TMGI, and a flow ID.

At step 504, the MBMS GW determines multimedia broadcast multicast group allocation information according to the session update request message.

In the embodiment, the multimedia broadcast multicast group allocation information at least includes a multicast address and an address type, and the address type may include IPV4, IPV 6.

At step 505, the BM-SC receives a response message sent by the MBMS GW.

In the embodiment, the response message at least includes the multicast address and the address type, which are allocated by the MBMS GW.

At step 506, the BM-SC sends an allocate TMGI response message to the NSE.

In the embodiment, the allocate TMGI response message at least includes the multicast address and the address type, which are allocated by the MBMS GW.

At step 507, the NSE sends an allocate TMGI response message to the first CSE.

In the embodiment, the allocate TMGI response message at least includes the multicast address and the address type, and the first CSE includes a CSE where a group is located.

At step 508, the first CSE sets attributes of multicast group resource according to the allocate TMGI response message.

Exemplarily, the first CSE sets a value of the multicast address as a value of the attribute multicastAddress of multicast group resource; the first CSE sets a value of the address type as a value of the attribute addressType of multicast group resource; and the first CSE sets a mapping relationship between the multicast address and a fanout request target as a value of the attribute multicastGroupFanoutTarget of multicast group resource.

At step 509, the first CSE sends a create local multicast group resource request to a second CSE.

In the embodiment, the create local multicast group resource request at least includes the multicast address, the address type, and the mapping relationship between the multicast address and the fanout request target, and the second CSE includes a CSE where members are located.

At step 510, the second CSE creates a local multicast group resource according to the create local multicast group resource request.

At step 511, the first CSE receives a create local multicast group resource response message sent by the second CSE.

At step 512, the first CSE creates multicast group management information locally according to the create local multicast group resource response message.

In the embodiment, the multicast group information includes a multicast address, a multicast type, and an address type.

In the embodiment, the first CSE can set the attributes of multicast group resource locally, which enables a group of IoT services to use the multicast services provided by a 3GPP network.

Figure 6:
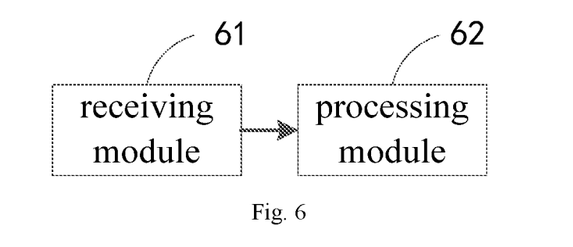
FIG. 6 is a schematic structural diagram of a first device for transmitting multicast group information according to an embodiment of the present disclosure.

FIG. 6 is a schematic structural diagram of a first device for transmitting multicast group information according to an embodiment of the present disclosure; and as shown in FIG. 6, a device for transmitting multicast group information provided by the present disclosure includes a receiving module 61 and a processing module 62. The device is disposed at a first CSE.

The receiving module 61 is configured to receive multicast group information transmitted by an underlying network element, wherein the first CSE includes a CSE where a group is located.

The processing module 62 is configured to set attributes of multicast group resource according to the multicast group information.

In the embodiment, the multicast group information transmitted by the underlying network element is received by the first CSE which includes a CSE where a group is located, and the first CSE sets the attributes of multicast group resource according to the multicast group information. In this way, the first CSE can set the attributes of multicast group resource locally, which enables a group of IoT services to use the multicast services provided by a 3GPP network.

In an embodiment, based on the above embodiment, the multicast group information at least includes a multicast address and an address type, which are allocated by the underlying network element.

In an embodiment, based on the above embodiments, the processing module 62 is further configured to set a value of the multicast address as a value of the attribute multicastAddress of multicast group resource, set a value of the address type as a value of the attribute addressType of multicast group resource, and set a mapping relationship between the multicast address and a fanout request target as a value of the attribute multicastGroupFanoutTarget of multicast group resource.

In an embodiment, based on the above embodiments, the receiving module 61 is further configured to receive a response message of multicast service request, which is fed back by the underlying network element through an NSE, and carries the multicast group information.

In an embodiment, based on the above embodiments, the response message of multicast service request includes an allocate TMGI response message.

In an embodiment, based on the above embodiments, the processing module 62 is further configured to send a create local multicast group resource request to a second CSE, wherein the create local multicast group resource request at least includes the multicast address, the address type, and the mapping relationship between the multicast address and the fanout request target, and the second CSE includes a CSE where members are located.

In an embodiment, based on the above embodiments, the receiving module 61 is further configured to receive a create local multicast group resource response message sent by the second CSE; and the processing module 62 is further configured to create multicast group information locally according to the create local multicast group resource response message, wherein the multicast group information includes a multicast type, a multicast address, and an address type.

Figure 7:
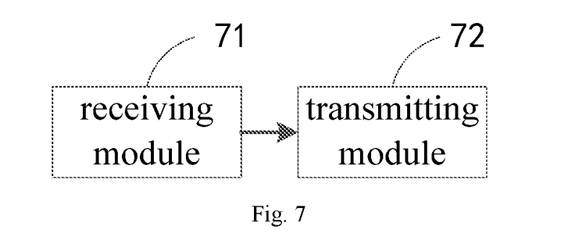
FIG. 7 is a schematic structural diagram of a second device for transmitting multicast group information according to an embodiment of the present disclosure.

FIG. 7 is a schematic structural diagram of a second device for transmitting multicast group information according to an embodiment of the present disclosure; and as shown in FIG. 7, a device for transmitting multicast group information provided by the present disclosure includes a receiving module 71 and a transmitting module 72. The device is disposed at an NSE.

The receiving module 71 is configured to receive multicast group information transmitted by an underlying network element.

The transmitting module 72 is configured to transmit the multicast group information to a first CSE which includes a CSE where a group is located.

In the embodiment, the NSE receives an allocate TMGI response message sent by a BM-SC, and the allocate TMGI response message at least includes a multicast address and an address type. The NSE sends an allocate TMGI response message to the first CSE, the allocate TMGI response message at least includes the multicast address and the address type, and the first CSE includes the CSE where the group is located. In this way, the first CSE can set attributes of multicast group resource locally, which enables a group of IoT services to use the multicast services provided by a 3GPP network.

In an embodiment, based on the above embodiment, the receiving module 71 is further configured to receive a response message of multicast service request, which is fed back by the underlying network element, and carries the multicast group information; and the transmitting module 72 is further configured to feed the response message of multicast service request back to the first CSE.

In an embodiment, based on the above embodiments, the response message of multicast service request at least includes a multicast address and an address type.

In an embodiment, based on the above embodiments, the response message of multicast service request includes an allocate TMGI response message.

The present disclosure further provides a system for transmitting multicast group information, including the above-mentioned device for transmitting multicast group information as shown in FIG. 6, and the above-mentioned device for transmitting multicast group information as shown in FIG. 7.

In the embodiment, the first CSE can set attributes of multicast group resource locally, which enables a group of IoT services to use the multicast services provided by a 3GPP network.

The embodiments disclosed and described above in the present disclosure are employed merely for facilitating understanding the present disclosure, and are not intended to limit the present disclosure. Without departing from the spirit and scope of the present disclosure, those skilled in the art may make various changes and variations to the forms and details of the embodiments. However, the scope of the present disclosure is limited to the scope defined by the appended claims.

INDUSTRIAL APPLICABILITY

According to the technical solutions of transmitting multicast group information of the present disclosure, the multicast group information transmitted by the underlying network element is received by the first CSE which includes the CSE where the group is located, and the first CSE sets the attributes of multicast group resource according to the multicast group information, so that the first CSE can set the attributes of multicast group resource locally, which enables the CSE where the group is located in an IoT multicast group to communicate with a 3GPP network through the multicast services thereof.

What is claimed is:

1. A method for transmitting multicast group information, comprising:
  receiving, by a first Common Services Entity (CSE), multicast group information transmitted by an underlying network element, wherein the first CSE comprises a CSE where a group is located; and
  setting, by the first CSE, attributes of a multicast group resource locally according to the multicast group information;
  wherein the multicast group information at least comprises a multicast address and an address type, which are allocated by the underlying network element;
  wherein setting, by the first CSE, the attributes of the multicast group resource locally according to the multicast group information comprises:
  setting, by the first CSE, a value of the multicast address as a value of an attribute multicastAddress of the multicast group resource;
  setting, by the first CSE, a value of the address type as a value of an attribute addressType of the multicast group resource; and
  setting, by the first CSE, a mapping relationship between the multicast address and a fanout request target as a value of an attribute multicastGroupFanoutTarget of the multicast group resource.

2. The method of claim 1, wherein the step in which the first CSE receives the multicast group information transmitted by the underlying network element comprises:
  receiving, by the first CSE, a response message of multicast service request, which is fed back by the underlying network element through a Network Service Entity (NSE), and carries the multicast group information.

3. The method of claim 2, wherein the response message of multicast service request comprises an allocate TMGI response message.

4. The method of claim 1, after the first CSE sets the attributes of the multicast group resource locally according to the multicast group information, further comprising:
  sending, by the first CSE, a create local multicast group resource request to a second CSE, wherein the create local multicast group resource request at least comprises the multicast address, the address type, and the mapping relationship between the multicast address and the fanout request target, and the second CSE comprising a CSE where members are located.

5. The method of claim 4, after the first CSE sends the create local multicast group resource request to the second CSE, further comprising:
  receiving, by the first CSE, a create local multicast group resource response message sent by the second CSE; and
  creating, by the first CSE, multicast group information locally according to the create local multicast group resource response message, wherein the multicast group information comprises a multicast type, the multicast address, and the address type.

6. A method for transmitting multicast group information, comprising:
  receiving, by a Network Service Entity (NSE), multicast group information transmitted by an underlying network element; and
  transmitting, by the NSE, the multicast group information to a first Common Services Entity (CSE) which comprises a CSE where a group is located, to enable the first CSE to set attributes of a multicast group resource locally according to the multicast group information;
  wherein the multicast group information at least comprises a multicast address and an address type, which are allocated by the underlying network element;
  wherein the attributes of the multicast group resource comprises an attribute multicastAddress, an attribute address Type and an attribute multicastGroupFanoutTarget, and transmitting, by the NSE, the multicast group information to the first CSE, to enable the first CSE to set the attributes of the multicast group resource locally comprises:
  to enable the first CSE to set a value of the multicast address as a value of the attribute multicastAddress;
  to enable the first CSE to set a value of the address type as a value of the attribute addressType; and
  to enable the first CSE to set a mapping relationship between the multicast address and a fanout request target as a value of the attribute multicastGroupFanoutTarget.

7. The method of claim 6, wherein the step in which the NSE receives the multicast group information transmitted by the underlying network element comprises:
  receiving, by the NSE, a response message of multicast service request, which is fed back by the underlying network element, and carries the multicast group information; and
  the step in which the NSE transmits the multicast group information to the first CSE comprises:
  feeding, by the NSE, a response message of multicast service request back to the first CSE.

8. The method of claim 7, wherein the response message of multicast service request at least comprises the multicast address and the address type.

9. The method of claim 7, wherein the response message of multicast service request comprises an allocate TMGI response message.

10. A device for transmitting multicast group information, the device being disposed at a first Common Services Entity (CSE) and comprising:
  a receiving module configured to receive multicast group information transmitted by an underlying network element, wherein the first CSE comprises a CSE where a group is located; and
  a processing module configured to set attributes of a multicast group resource locally according to the multicast group information;
  wherein the multicast group information at least comprises a multicast address and an address type, which are allocated by the underlying network element;
  wherein the processing module is configured to:
  set a value of the multicast address as a value of an attribute multicastAddress of the multicast group resource;
  set a value of the address type as a value of the attribute addressType of the multicast group resource; and
  set a mapping relationship between the multicast address and a fanout request target as a value of an attribute multicastGroupFanoutTarget of the multicast group resource.

11. The device of claim 10, wherein the receiving module is further configured to receive a response message of multicast service request, which is fed back by the underlying network element through a Network Service Entity (NSE), and carries the multicast group information.

12. The device of claim 11, wherein the response message of multicast service request comprises an allocate TMGI response message.

13. The device of claim 10, wherein the processing module is further configured to send a create local multicast group resource request to a second CSE, wherein the create local multicast group resource request at least comprises the multicast address, the address type, and the mapping relationship between the multicast address and the fanout request target, and the second CSE comprises a CSE where members are located.

14. The device of claim 13, wherein the receiving module is further configured to receive a create local multicast group resource response message sent by the second CSE; and the processing module is further configured to create multicast group information locally according to the create local multicast group resource response message, wherein the multicast group information comprises a multicast type, the multicast address, and the address type.

* * * * *